United States Patent Office

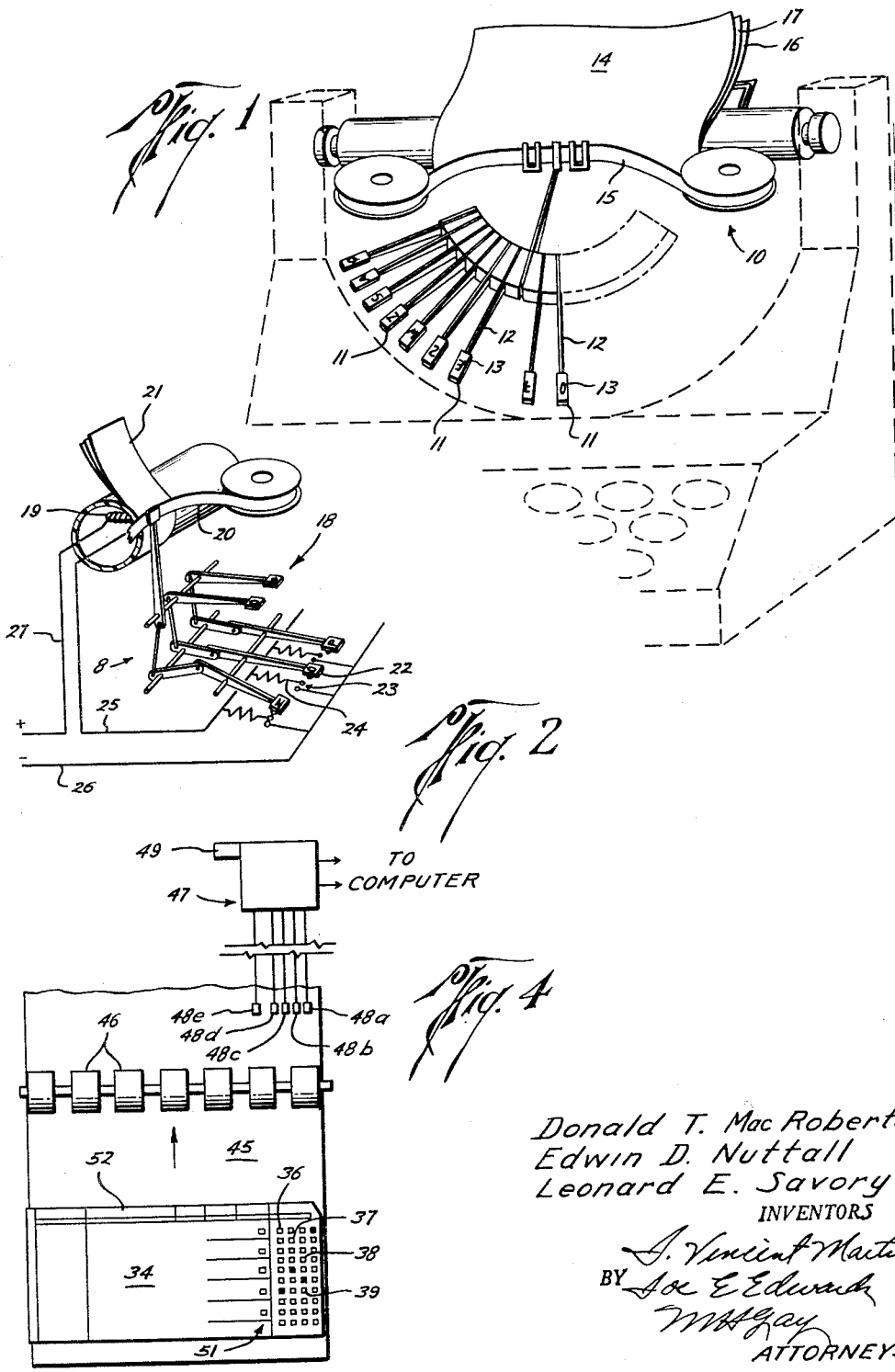

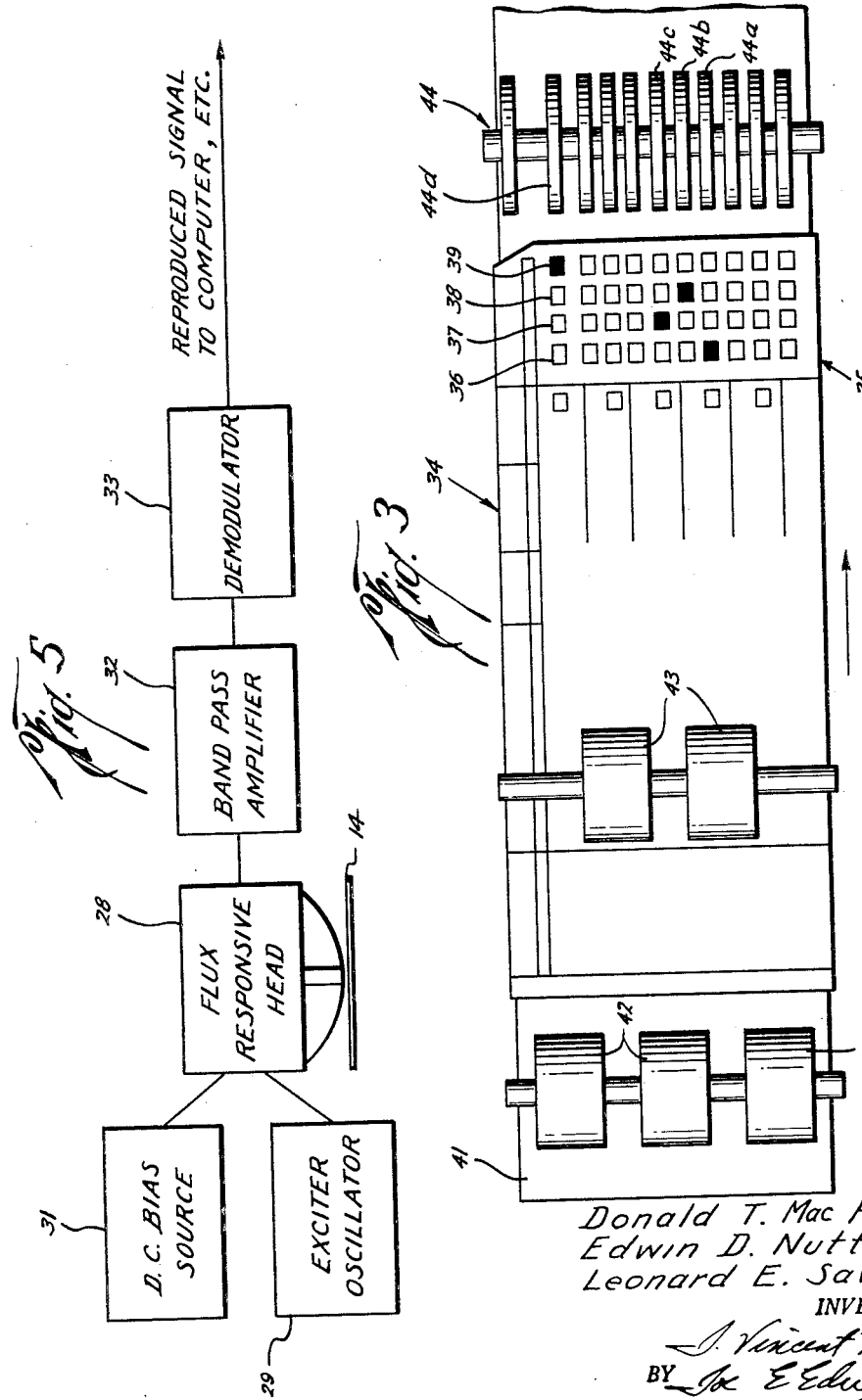

3,125,748
Patented Mar. 17, 1964

3,125,748
METHOD AND SYSTEM OF WRITING AND READING VISIBLE AND MAGNETIC CHARACTERS OF DIFFERENT MAGNETIC FLUX DENSITIES
Donald T. MacRoberts, Edwin D. Nuttall, and Leonard E. Savory, Shreveport, La., assignors to United Gas Corporation, Shreveport, La., a corporation of Delaware
Filed July 13, 1959, Ser. No. 826,699
11 Claims. (Cl. 340—174.1)

This invention relates to methods and systems of writing and reading characters in which the reading may be either magnetic or may be visual and magnetic.

The increased use of computers and machine-accounting methods by industry for accounting and operations analysis increases the need for a simple magnetic character writing and reading system which can be used in preparing data for input into these devices, and which will permit visual reading of the data if desired.

Examples of some of the uses to which a character writing and reading system can be put are: Customer meter reading and billing, accounts receivable accounting, reading of data arranged in tabular form, reading of information stored on cards for conversion to other forms of writing or reading, Teletype messages, etc.

It is an object of this invention to provide a method and system of reading and writing in which the characters may be read visually, or in which the characters may be read magnetically.

Another object is to provide a method and system of writing and reading characters in which the characters may be read magnetically without reference to the specific configuration of the character when reading magnetically.

Another object is to provide a system for writing visually and magnetically readable characters in which machines such as typewriter, printing press, etc. are employed to deposit ink or similar writing or recording material on a sheet and in which the ink is simultaneously magnetized to discrete levels or magnetic flux densities to identify different characters and permit them to be thereafter read magnetically.

Another object is to provide a method and apparatus for visual and magnetic writing and reading in which magnetic ink or other writing or recording material may be placed on a sheet in particular places on the sheet to indicate characters, the magnetic ink or other writing or recording material so positioned thereafter being magnetized to different levels or magnetic flux densities to indicate different characters, and the sheet thereafter read magnetically.

Other objects, features and advantages of this invention will be apparent from the specification, the drawings and the claims.

In accordance with this invention, visual magnetic material is deposited on a sheet at spaced intervals and simultaneously the magnetic material is magnetized to different levels or intensities for each different character. Thereafter, the material may be read by scanning the sheet with an electrical device which generates a signal proportional to the strength of the magnetic field gradient through which it passes. Thus, the printed or written character is converted into an electrical signal which may in turn be fed into the various computers and accounting machines presently being used by industry for processing by such machines, as will be understood by those skilled in the art.

In the drawings, wherein several embodiments of this invention are illustrated, and in which like reference numerals indicate like parts:

FIGURE 1 is a schematic illustration, partly in full lines and partly in outline, of a typewriter constructed in accordance with this invention;

FIGURE 2 is a fragmentary schematic view of another form of typewriter constructed in accordance with this invention;

FIGURE 3 is a schematic plan view of a magnetizing machine constructed in accordance with this invention;

FIGURE 4 is a schematic plan view of a reading device for reading cards from the machine of FIGURE 3; and FIGURE 5 is a block diagram of one of the reading heads of the reading device of FIGURE 4.

As noted above, visual and magnetic readings are made possible in the system of this invention by using magnetic recording material, such as ink which may be magnetic material, such as oxides of iron, in a vehicle of ink. For example, the ink may be prepared in the manner taught in "Magnetic Recording Techniques"—W. Earl Stewart—McGraw-Hill Book Company, Inc., New York, 1958, at page 48. The ink may be deposited on a sheet in any of the conventional manners, such as typewriters, printing presses, etc., and, in accordance with this invention, the character of magnetic material is magnetized substantially simultaneously with its being deposited on the sheet. Each character is assigned a different magnetic level or flux density, and the ink deposited is magnetized to this magnetic level or flux density. The writing or printing thus obtained is permanent in character, and the data may be fed into computers or machines immediately, or at any time thereafter by passing the sheet adjacent to an electrical reading devices or devices which measure the level or flux density of magnetism of each recorded character and generate an electrical signal proportional to the magnetic level of the character sensed. By way of example, a magnetic reading head for practicing this invention may be obtained from Clevite Electronic Components of Cleveland, Ohio, and is known as "Brush Flux Responsive Head BK3501." The signal generated by this brush flux responsive head, or a plurality of these heads, may be fed into conventional computers and, by way of example, the signal may be fed into a Datatron No. 204 obtainable from the Electrodata Division of Burroughs Corporation of Pasadena, California. For instance, a number of several digits may be fed into this computer from the reading head in the same manner as impulses from the keyboard of the computer.

Of course, magnetic material on a sheet which is not visible may be magnetized in accordance with this invention. For example, magnetic tape may be magnetized in accordance with this invention and read magnetically.

As mentioned above, each character will be magnetized to a specific and identifiable magnetic energy level or flux density by appropriate means which will be described more fully hereinafter. These specific energy levels or magnetic inductions all together will comprise a gradient of magnetic energy which will fall between threshold noise and saturation. Noise is defined as the point where an impressed signal does not change the threshold output of the equipment. Saturation is defined as the point where linear signal outputs depart from linear signal increases. Each character will represent a specific point on this gradient. Each point will be separated from the adjacent points by fixed increments of energy plus or minus realistic tolerances to permit minor degradations of magnetic level or induction to occur without reducing the reading accuracy; i.e., to a different magnetic flux density of substantially predetermined gausses, as distinguished from field strength in oersteds, within a limited range for each different character. For instance, the numerals 0–9 and the letters A through Z might be provided by a gradient of from 10 to 885 millivolts. This will permit a 25 millivolt spread between characters. With this arrangement an allowance of up to 10 millivolts for loss in initial charge or for weaker charge obtained on second or third magnetized carbon copies will be provided. This will still leave a guard band of 15 millivolts assuring proper identification of the characters.

Referring now to FIGURE 1, there is shown a typewriter constructed in accordance with this invention for writing visually and magnetically discernable characters. The typewriter indicated generally at 10 is conventional in construction except that the type of each key has associated therewith a permanent magnet 11. The permanent magnet may be attached to the conventional type, or the keys may be built so that the permanent magnet is attached to the arm 12, and the type 13 is supported on the permanent magnet in the manner illustrated. In the conventional fashion, depressing a key activates mechanism which shifts the carriage a predetermined distance and moves the ribbon a predetermined distance.

In accordance with this invention, the several permanent magnets 11 will each have different strengths so that when brought into close proximity with magnetic materials they will magnetize such materials to varying magnetic inductions or flux densities to thereby indicate the particular character with which a particular magnet is associated. It will be seen that the magnets are not dependent upon the shape or size of the type, and, therefore, the magnetic writing will be a function of the strength of the several magnets and not of the size or shape of the characters or type.

In order to provide magnetic material on the sheet 14, a ribbon 15 is handled by the machine in the conventional way, and this ribbon is impregnated with magnetic ink. Thus, as the typewriter is operated and type is pressed against the ribbon it will deposit magnetic material from the ribbon onto the sheet 14. Simultaneous with the deposition of magnetic material, the magnet 11 on the particular key striking the ribbon will magnetize the deposited magnetic ink to a predetermined level or magnetic flux density which may thereafter be read by a magnetic sensing device.

If desired, a carbon copy 16 may be made which can be read both magnetically and visually by employing a sheet of carbon paper 17 which deposits finely divided magnetic recording material on the carbon copy by transferring it from the carbon to the carbon copy. When the key is pressed against the ribbon 15, it will cause the transfer of magnetic material from the carbon to the carbon copy and simultaneously magnetize the deposited material to the desired level or magnetic induction.

It is apparent that the ribbon 15 provides a magnetic tape and as each key is brought into close proximity with the tape it would be magnetized to the desired level or magnetic flux density which might be later read magnetically in the same manner as the sheet 14. In like manner, the device might be utilized to magnetize a ribbon of any type of magnetic material, such as magnetic tape wherein finely divided magnetic material conventionally comprises part of the tape material.

Referring now to FIGURE 2, a different type of typewriter is illustrated. In this instance, the conventional typewriter, a portion of which is indicated schematically at 18, is constructed to write in the conventional manner. Within the platen, an electromagnet 19 is provided which is positioned to magnetize the magnetic material transferred from the ribbon 20 to the sheet 21 substantially simultaneously with the transfer. Each key 22 of the typewriter keyboard is provided with a contact indicated generally at 23 which is closed by depressing the key 22. Each of the contacts is associated with a resistance 24 which shunts across lines 25 and 26. Line 25 extends to the electromagnet 19. The line 27 also extends to the winding of the electromagnet and the lines 26 and 27 are connected to a suitable source of electrical power not shown. Each of the several resistances 24 is of different value and function like potentiometers, and, therefore, selectively depressing the several keys 22 will result in the flow of different currents through the electromagnet 19. As the strength of the electromagnet will thus be varied, the deposited magnetic material will be magnetized to selective different levels or magnetic flux densities which can be read with a flux responsive head. Of course, as each key is depressed to close the contact 23, it actuates the linkage indicated generally at 28 which moves the type into contact with ribbon 20. Here again, the ribbon 20 will also have written thereon magnetically the message typed.

Referring now to FIGURE 5, there is shown an apparatus for reading magnetically the recorded characters placed on the sheets 14, 16 and 21 by the typewriters shown in FIGURES 1 and 2. FIGURE 5 illustrates in block diagram the several components of the brush flux responsive head identified hereinabove. The sheet 14 is placed adjacent to the flux responsive head 28 and the head and sheet moved relative to each other so that the head will scan the characters on the sheet 14. The head operates as follows: An exciter oscillator 29 introduces a signal of known frequency into the head 28. A balanced magnetic bridge structure combines the signal flux from the characters on sheet 14 and the exciter flux from the oscillator 29 to produce a strong second harmonic of the exciter frequency across the signal winding. A D.C. biasing source or phase detector 31 transforms this amplitude modulated second harmonic at twice the signal frequency into a signal modulated carrier which is passed to the band pass amplifier 32. The carrier is demodulated in demodulator 33 to an output signal truly representative of the recorded flux and the original recorded signal. The reproduced signal may, of course, be recorded or fed directly to computers or other machines which are programmed to utilize the information from the sheet 14.

Referring now to FIGURES 3 and 4, there is shown a system of utilizing this invention in the handling of meter cards. A card such as shown at 34 would have printed thereon the name and address of a consumer of gas, for example. The meter reader would indicate in the rows of blocks shown at 35 on the right hand side of the card the reading of the meter. It will be noted that four rows are provided and ten blocks are provided in each row. These blocks would represent the numerals zero through nine. The left-most row 36 would represent thousands, the next row 37 would represent hundreds, the next row 38 would represent tens, and the next row 39 would represent units. Considering the lower most block to represent the numeral zero, and the numerals 1 through 9 to be represented by the blocks progressing upwardly from this point, the meter reading illustrated in FIGURE 3 would be 3549. The meter reader would utilize a means of depositing visible magnetic material in these blocks in the manner shown in FIGURE 3. This might be accomplished by using a pen filled with invisible magnetic material or visible magnetic ink.

The magnetizing machine shown in FIGURE 3 includes a base 41 on which are mounted a plurality of rollers 42 and 43 for feeding the card 34 through a plurality of magnets indicated generally at 44, each of different strength. These magnets are also mounted on base 41 and one magnet is provided for each of the blocks in each of rows 36 through 39. It will be noted that these rows extend parallel to each other and are arranged with the blocks in side by side relation. As the group of magnets 44 includes a separate magnet for passing over each block of each row, and the rows and blocks are arranged as explained above, separate magnets will magnetize the magnetic material in the several blocks of the rows indicated at 35. As each of the blocks of the several rows which represent the same numeral will pass under a common magnet, all of the magnetic material in these blocks will be magnetized to the same level. Thus, in the illustrated example, magnet 44a will magnetize the magnetic material in row 36, magnet 44b will magnetize the magnetic material in row 38, magnet 44c will magnetize the magnetic material in row 37, and magnet 44d will magnetize the magnetic material in row 39.

After passing through the machine 3, the card 34 is fed to the machine of FIGURE 4 which includes a base 45 having a plurality of feed rollers 46 mounted thereon and a reading device indicated generally at 47. This machine feeds the card under the several reading heads 48a through 48e, inclusive. The machine is arranged to pass the rows 36 through 39 underneath the rows 48d, 48c, 48b and 48a, respectively, by moving the card in a direction normal to its movement through the magnetizing machine of FIGURE 3. Thus, the reading head 48a senses the unit 9 recorded on the card, the unit 48b senses the value 4 from the tens column recorded on the card, the unit 48c senses the value 5 from the hundreds column, and the unit 48d senses the value 3 from the thousands column. After the card has passed the reading heads 48a through 48e, which may be the flux responsive magnetic heads hereinbefore identified, the card strikes a switch 49 which clears the reading device 47 and sends the composite number to the computer or other device which is programmed to receive the information from the card. The unit 47 will operate in the same manner as the keyboard of the Datatron computer hereinbefore identified. Actuation of each of the reading heads 48a through 48d may be likened to punching the keyboard of the Datatron computer. Actuation of the trip 49 will send the composite number to the computer in the same manner as the clearing key of the Datatron computer.

In some instances, a meter cannot be read and the explanation of the failure to read may be indicated in the row of blocks 51. These blocks, if utilized, will be magnetized by the magnets indicated generally at 44 and will actuate the reading head 48e and this information will be fed to the computer.

Of course, the upper section 52 of the card will normally carry the service address and identification information which might be applied magnetically with the typewriters of FIGURE 1 or 2, and this information might also be fed to the computer or accounting machinery by the card passing under suitable reading heads, such as those shown at 48a through 48e, to identify the service location which is represented by the card 34.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. The method of storing information on a sheet comprising, transferring visible magnetic material to spaced areas on a sheet to indicate different information characters, and magnetizing the magnetic material of each character to a different magnetic flux density for each different respective information character.

2. A character writing and reading system comprising, a carrier member, means for depositing visible magnetic material at spaced points to provide discrete characters on the carrier member, means for magnetizing the deposited magnetic material to selected different magnetic flux densities for different characters on the carrier member, and character identifying means for scanning the carrier member and generating electrical signals of magnitudes proportional to each magnetic flux density sensed for identifying the character by the respective signal magnitude.

3. A system for writing visible and magnetic characters comprising, a member impregnated with magnetic ink, character type individually pressing said impregnated member against a carrier member for transferring magnetic ink to the carrier member, and means for magnetizing the transferred ink to a different magnetic flux density for each different character type as the ink is transferred to the paper.

4. A character writing system comprising, a carrier member, means for moving the carrier member along a fixed path, means for depositing visible magnetic material on the carrier member, and means for magnetizing successive discrete areas of the magnetic material so deposited to selected magnetic flux densities representative of respective characters.

5. A character writing and reading system comprising, a carrier member, means for moving the carrier member along a fixed path, means for depositing visible magnetic writing material on the carrier member for each character, means for magnetizing successive increments of the magnetic material to selected magnetic flux densities as it is deposited, and means for scanning the carrier member and generating electrical signals of magnitudes proportional to each magnetic flux density sensed whereby the respective signal magnitudes identify the characters scanned.

6. A machine for writing magnetic characters comprising, an electromagnet, a ribbon comprising magnetic writing material, means for moving said ribbon and electromagnet relative to each other, a plurality of keys representing discrete characters and including means for operably selectively engaging said ribbon by individual keys for depositing magnetic writing material on a carrier member, and an electrical circuit for energizing said electromagnet including a switch for closing the circuit and means associated with each key for controlling the flow of current through said electromagnet, said means for controlling flow of current providing a different selected flow of current for each key switch to energize the electromagnet to a different magnetic induction for each respective switch.

7. A machine for writing magnetic characters comprising, a plurality of keys, a separate permanent magnet carried by each key, each magnet being of a selected different coersive strength from each other magnet, a ribbon comprising magnetic writing material, means for selectively individually moving said permanent magnets to a position adjacent to said ribbon for magnetizing successive discrete areas of magnetic writing material on said ribbon to selected different magnetic flux densities according to the coersive strength of each respective magnet, and means for driving said ribbon to present different areas at said position.

8. A system for writing and reading characters on a carrier member comprising means for depositing visible magnetizable writing ink material at spaced points to indicate discrete characters on the carrier member, means for magnetizing the magnetizable material deposited on the carrier member by said depositing means to selected different magnetic flux densities of substantially predetermined gausses for different characters, and means for electromagnetically scanning the carrier member and generating electrical signals of magnitudes proportional to the magnetic flux density of each recorded character.

9. A system for recording on a carrier member visible characters comprising magnetizable recording material including means for recording the visible characters on discrete areas of the carrier and magnetizing said discrete areas of the magnetizable material on the carrier member to selected different magnetic flux densities for each different character, and means for selectively operating said recording means according to the character to be recorded.

10. A system for recording characters on a carrier member comprising magnetizable finely divided recording material including means for recording characters on said carrier member by magnetizing discrete areas of magnetizable material to selected different magnetic flux densities for each different character, and means for selectively operating said recording means according to the characters to be recorded.

11. A system for recording and reading characters on a carrier member comprising magnetizable recording material including means for recording characters on said carrier member by magnetizing a discrete area of the magnetizable material thereof to a selected different magnetic flux density for each different character, and means for reading and identifying recorded characters by electromagnetically scanning the carrier member and generating electrical signals proportional to the magnetic flux density of the magnetized material of each character scanned on the carrier member and for identifying the character by the magnetic flux density of the discrete area.

References Cited in the file of this patent
UNITED STATES PATENTS

| | | |
|---|---|---|
| 2,430,457 | Dimond | Nov. 11, 1947 |
| 2,751,433 | Linger | June 19, 1956 |
| 2,784,392 | Chaimowicz | Mar. 5, 1957 |
| 2,791,310 | Jones | May 7, 1957 |
| 2,856,256 | Carman | Oct. 14, 1958 |
| 2,936,112 | Dickinson | May 10, 1960 |
| 2,943,907 | Dickinson | July 5, 1960 |
| 2,961,649 | Eldredge et al. | Nov. 22, 1960 |

OTHER REFERENCES

"Electricity and Magnetism," by F. Sears, Addison-Wesley Publishing Co., 1954, pp. 339–340.